United States Patent [19]

Huss et al.

[11] Patent Number: 5,325,007
[45] Date of Patent: Jun. 28, 1994

[54] STATOR WINDINGS FOR AXIAL GAP GENERATORS

[75] Inventors: John B. Huss, Rockton; Mahesh Shah, Rockford, both of Ill.

[73] Assignee: Sundstrand Corporation, Rockford, Ill.

[21] Appl. No.: 9,630

[22] Filed: Jan. 27, 1993

[51] Int. Cl.⁵ .............................................. H02K 3/00
[52] U.S. Cl. ..................................... 310/180; 310/43; 310/64; 310/89; 310/114; 310/184; 310/254
[58] Field of Search ............... 310/268, 114, 43, 60 A, 310/64, 179, 180, 184, 207, 89, 60 R, 58, 59, 254

[56] References Cited

U.S. PATENT DOCUMENTS

| | | |
|---|---|---|
| 2,700,343 | 1/1955 | Pezzillo, Jr. ............... 310/268 X |
| 3,320,454 | 5/1967 | Kober . |
| 3,428,840 | 2/1969 | Kober . |
| 3,953,751 | 4/1976 | Merkle ............................ 310/268 |
| 4,229,671 | 10/1980 | Lesokhin ........................ 310/64 |
| 4,303,842 | 12/1981 | Nathenson . |
| 4,307,311 | 12/1981 | Grozinger ..................... 310/179 |
| 4,427,907 | 1/1984 | Flick .............................. 310/64 |
| 4,430,591 | 2/1984 | Nemeni .......................... 310/64 |
| 4,451,749 | 5/1984 | Kanayama et al. . |
| 4,500,806 | 2/1985 | Kanayama et al. . |
| 4,644,207 | 2/1987 | Catterfeld et al. . |
| 4,675,591 | 6/1987 | Pleiss ............................. 310/184 |
| 4,947,072 | 1/1990 | Watkins ......................... 310/179 |
| 4,959,578 | 9/1990 | Varga . |
| 5,036,239 | 7/1991 | Yamaguchi ................... 310/268 |
| 5,055,729 | 10/1991 | Fogarty et al. . |

Primary Examiner—R. Skudy
Attorney, Agent, or Firm—Marshall, O'Toole, Gerstein, Murray & Bicknell

[57] ABSTRACT

Electromotive apparatus comprising at least one winding (30) including a plurality of generally triangular coil turns (34). A plurality of generally triangular stator segments (55, 56, 57) are mounted within the coil turns (34). The winding is formed by a hollow conductor, and it is shaped for connection to a source of cooling fluid. A molded support (32) is fastened to the windings 30 and to the segments (55, 56, 57) for supporting the apparatus at its outer diameter.

13 Claims, 6 Drawing Sheets

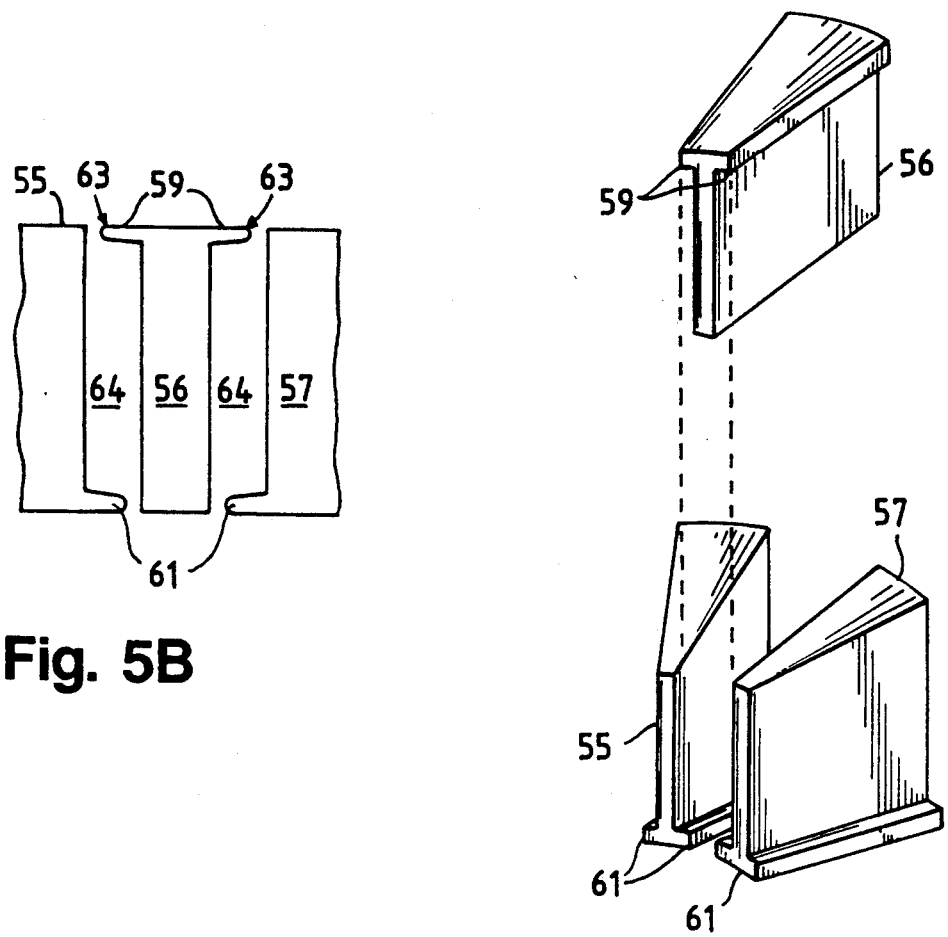
Fig. 5B
Fig. 5A
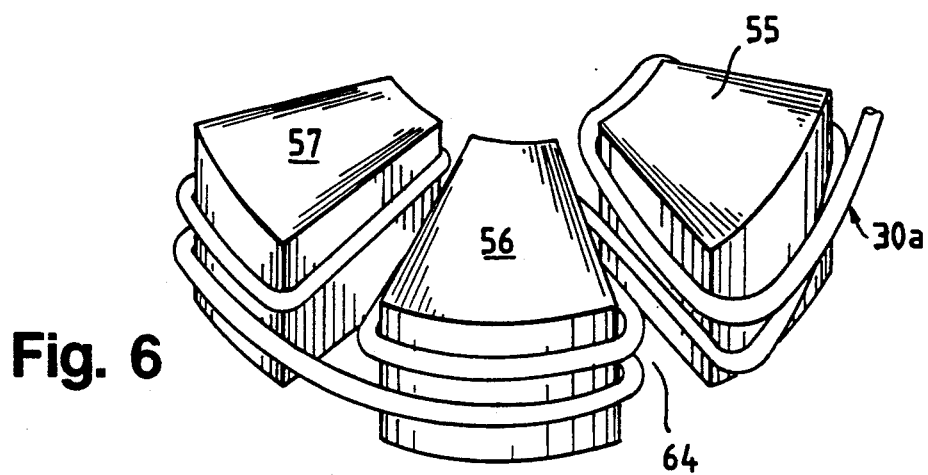
Fig. 6

STATOR WINDINGS FOR AXIAL GAP GENERATORS

FIELD AND BACKGROUND OF THE INVENTION

This invention relates to an electromotive machine, and more particularly to a stator winding for an axial air gap generator.

While the typical electric motor or generator in common use is a type referred to as a radial air gap device, axial air gap devices are also well known. In a radial air gap device, a cylindrical rotor turns within an outer cylindrical stator, whereas an axial air gap device includes a generally flat "pancake" stator and, coaxial with it, at least one generally flat "pancake" rotor. The T. S. Varga U.S. Pat. No. 4,959,578, for example, describes a motor of the axial gap type.

An axial gap permanent magnet (PM) generator has advantages making it useful in aircraft electric power generating systems because it is relatively light, short and efficient. A preferred arrangement is one including a stator having windings and laminated stator teeth, and a PM rotor on each side of the stator.

Such an arrangement presents construction problems, however. The only practical way to support the stator is by attachment to the end turns at the outer diameter of the stator windings. Since a rotor is on each side of the stator, no "back iron" is provided in the stator, and therefore the stator teeth must be supported by other means. Further, the stator windings must be mounted in a relatively tight space, particularly at the inner diameter of the stator. At the outer diameter of the stator, the end turns of a conventional winding can be long and bulky, resulting in higher copper losses (and heat) and an undesirable increase in the overall diameter of the stator.

It is a primary object of the present invention to provide an improved construction which avoids the foregoing problems.

SUMMARY OF THE INVENTION

Apparatus in accordance with the invention comprises at least one winding including a plurality of generally triangular coil turns and a plurality of outer end turns, the outer end turns connecting the coil turns. A plurality of generally triangular stator teeth are mounted within the coil turns. The winding is formed by a hollow conductor, and it is shaped for connection to an electrical power system and to a source of cooling fluid. A support is fastened to the winding and to the teeth for supporting the stator at its outer diameter.

BRIEF DESCRIPTION OF THE DRAWINGS

The invention will be better understood from the following description taken in conjunction with the accompanying figures of the drawings, wherein:

FIG. 5A is an exploded perspective view showing stator segments;

FIG. 5B is a fragmentary view of the segments;

FIG. 6 is a fragmentary perspective view showing a winding and segments;

DETAILED DESCRIPTION OF THE DRAWINGS

Figure 1:
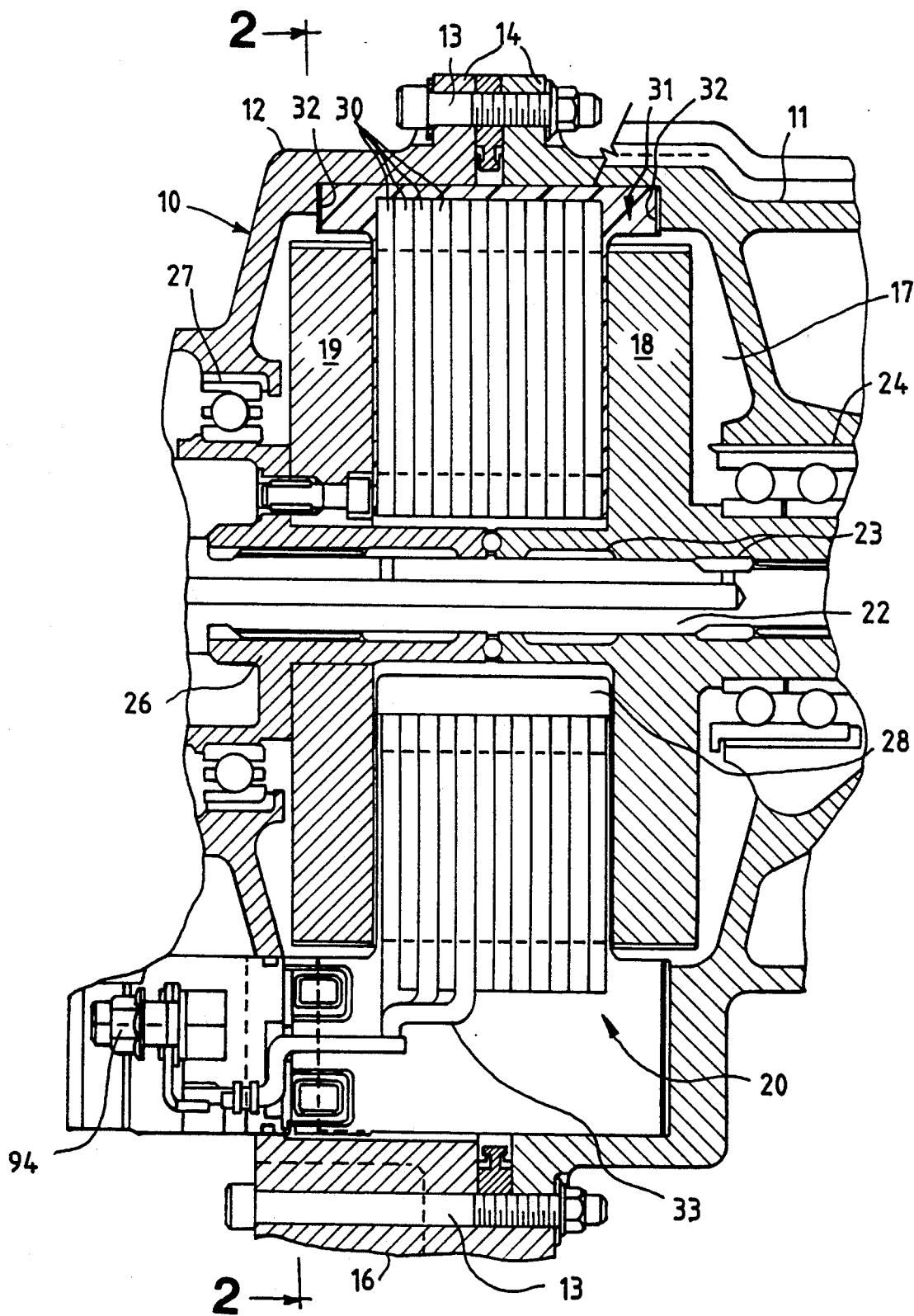
FIG. 1 is a fragmentary sectional view of a machine including apparatus in accordance with the invention.

With reference first to FIG. 1, there is shown a specific example of apparatus in accordance with the invention comprising an axial air gap dual permanent magnet generator including, on the stator, two three-phase windings connected in series for a total of six phases. The apparatus comprises an outer housing or casing 10 formed by two casing halves 11 and 12 that are fastened together by a plurality of bolts 13. the bolts 13 extend through axially extending holes in outer radial flanges 14 formed on the casing. In the present instance, the bottom side 16 of the casing is mounted on a support (not shown). The two casing halves 11 and 12 are generally cylindrical and form a hollow cavity 17 which houses two rotors 18 and 19 and a stator 20 constructed in accordance with this invention. Extending coaxially through the housing or casing 10 is a rotatable drive shaft 22 which carries the two rotors 18 and 19. The rotor 18 includes an axially extending tubular part 23 which is secured to the shaft 22 by, for example, keys or splines, and the outer periphery of the part 23 is rotatably mounted on the casing half 11 by a ball-bearing set 24. The other rotor 19 is also secured to the shaft 22 by a key or splined connection through a cylindrical part 26, and another ball-bearing set 27 rotatably supports the cylindrical part 26 on the housing half 12. Thus the shaft 22 and the two rotors 18 and 19 rotate as a unit within the casing 10.

The two rotors 18 and 19 are, in this specific example, permanent magnet types. The magnets are mounted in flat circular "pancake" type rotors in a conventional manner, and the two rotors 18 and 19 are axially spaced apart to form a stator opening between them, the numeral 28 indicating the stator opening, and the stator 20 is supported by the casing 10 within the stator opening 28.

In the present specific example, the stator includes two sets of three phase windings 30 connected in series, thereby making a total of six phases as previously mentioned. As will be described, each phase winding is mounted in two planes. Consequently, as shown in FIG. 1, the windings 30 appear to be in a total of 12 planes. All of the windings and the pole segments are secured together by being encapsulated in a cast molding indicated generally by the numeral 31 in FIG. 1. The molding 31 is held in place in the casing 10 by positioning the outer periphery of the molding between shoulders 32 formed on the inner periphery of the casing halves and tightening the bolts to cause the halves to compress the molding 31 between the shoulders 32. The windings 30 include leads 33 which extend radially outwardly from the outer diameter of the stator and are connected to electrical terminals and to cooling fluid connections as will be described later.

Figure 2:
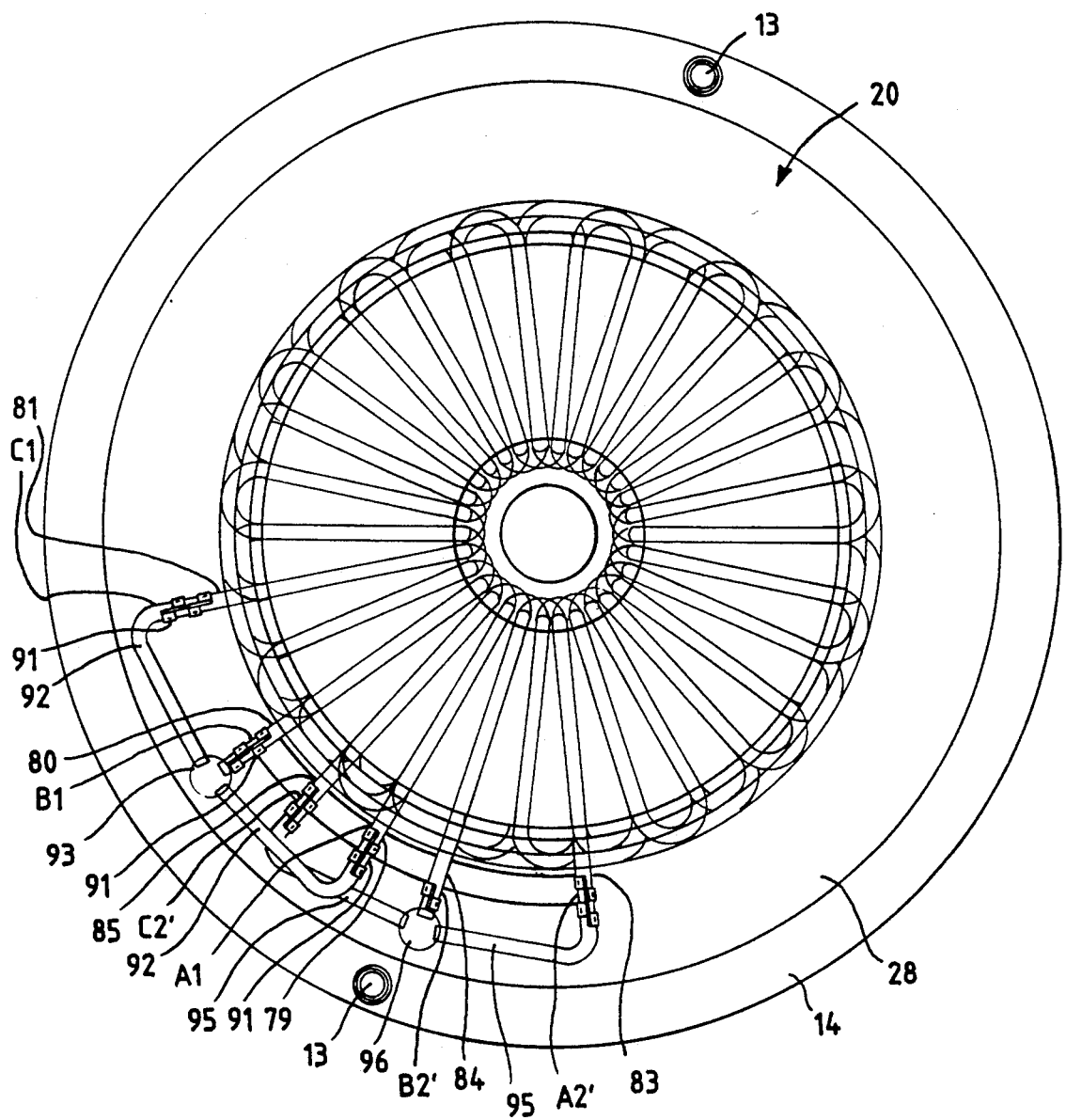
FIG. 2 is a sectional view taken on the line 2—2 of FIG. 1.
Figure 3:
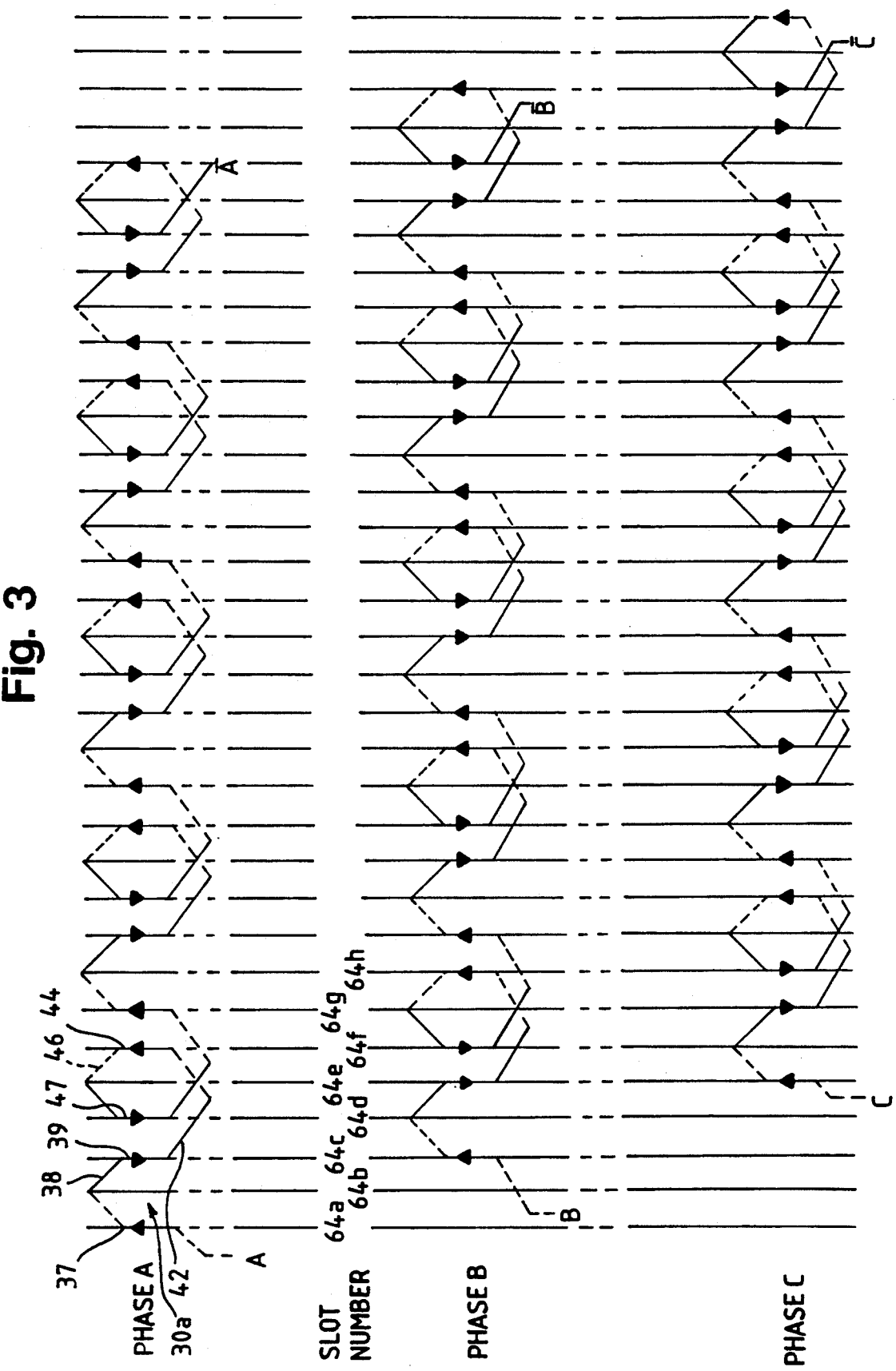
FIG. 3 is a schematic electrical diagram showing the winding pattern for a 10-pole machine.
Figure 4:
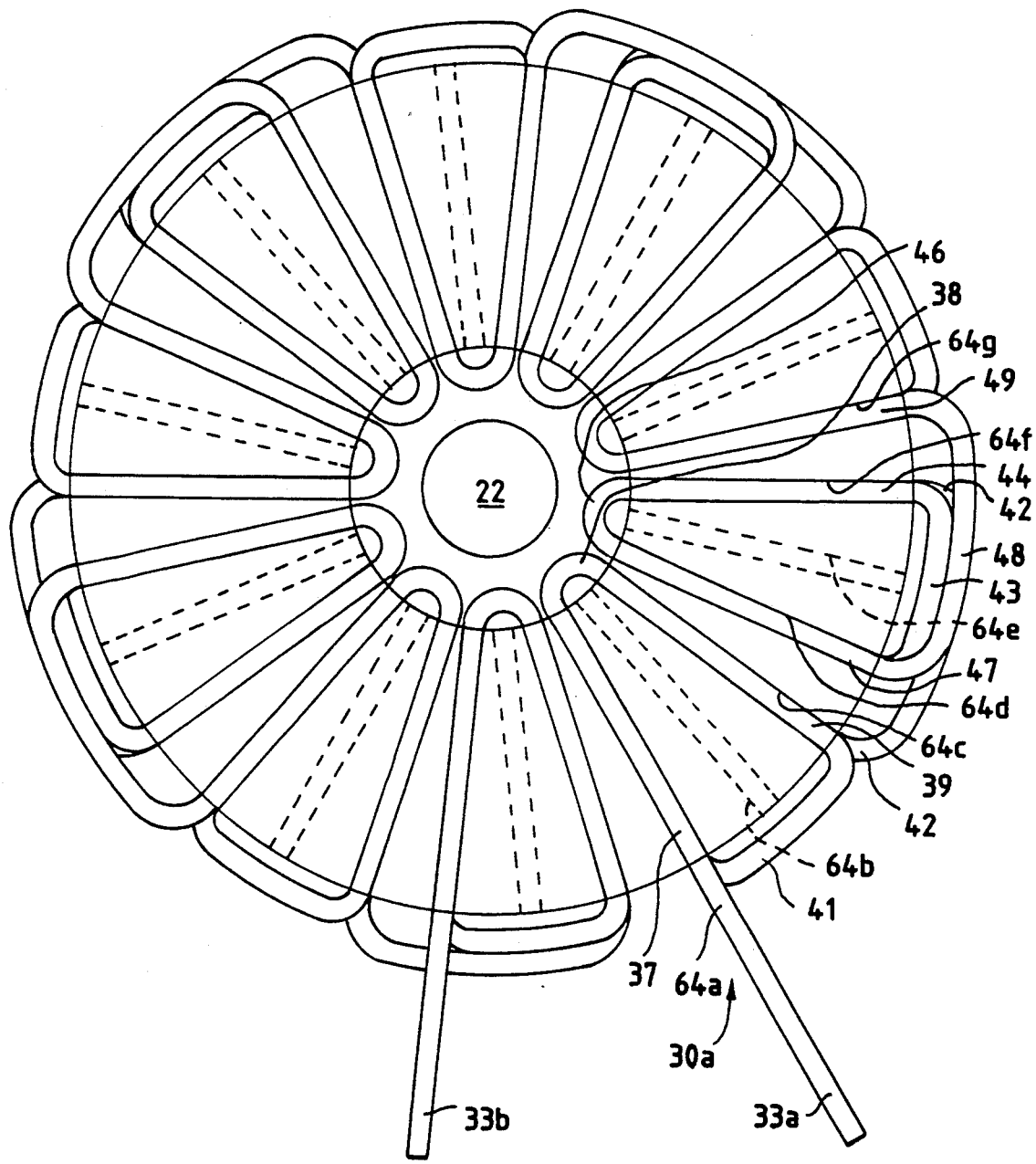
FIG. 4 is a view showing one-phase winding for a 10-pole machine.

With specific reference to FIGS. 2, 3, and 4, FIG. 4 illustrates the winding pattern for one winding 30a. The stator in this specific example includes a total of thirty stator slots 64, some of which are indicated by the numerals 64a through 64h in FIG. 3 and in FIG. 4. With specific reference to FIG. 4, a winding lead 33a enters slot 64a from the outer diameter and extends in a first plane through the slot 64a to the inner diameter, bends at the inner diameter and then extends radially outwardly in slot 64c, the portion of the winding 30a in slot 64a being indicated by the numeral 37, the turn at the inner diameter being indicated by the numeral 38, and the outwardly extending portion in slot 64c being indicated by the numeral 39. This turn then bends back to slot 64a at the outer diameter portion indicated by the numeral 41, the portion 41 also being bent to extend into the second plane which is closely adjacent and immediately behind the winding portion 37. The portion of the turn in the second plane then extends to the inner diameter again through slot 64a, turns at the inner diameter and extends outwardly in the second plane in the slot 64c behind the portion 39, and then bends (still in the second plane), at the portion 42 and enters the slot 64f. At slot 64f, the turn extends toward the center in the second plane, turns at the inner diameter portion 46 and extends radially outwardly in slot 64d. Coming out of slot 64d, the winding portion 43 bends back into the first plane and returns to slot 64f. The portion 44 then extends radially inwardly to the inner turn 46, and outwardly at the portion 47 to the outer diameter. The outer diameter portion 48 then turns, still in the first plane, to slot 64g and the portion 49 then extends radially inwardly in the slot 64g. The portion 49 is thus comparable to the portion 37 previously described and the foregoing winding or turning pattern is repeated around the circumference of the stator and terminates at the lead 33b which extends radially outwardly. Thus each turn includes two coils or loops and each turn extends in two closely adjacent planes. The foregoing pattern is illustrated in FIG. 3, phase A (winding 30a), except that FIG. 3 does not show the second turn in each pair of stator slots. FIG. 3 also shows phases B and C which are wound similarly to phase A except that phase B is offset by two slots 64 from phase A and phase C is offset two slots 64 from phase B. Since each of the phases A, B, and C are formed in two adjacent planes, the three phases require a total of six planes. As previously mentioned, two sets of three-phase windings 30 are provided in the present specific example, thereby forming a total of twelve planes as illustrated for the stator in FIG. 1.

After all of the phase windings 30 have been bent as described, they are stacked one on top of the other in circumferentially spaced and axially adjacent relation, and then the pole segments are inserted into the open spaces between the portions of each turn. For example, a pole segment is inserted between slots 64a and 64b, another segment is inserted between slots 64b and 64c, and so on around the entire stator, and the segments are circumferentially spaced apart to form the slots 64 that receive the winding turns.

The construction of the pole segments is best illustrated in FIGS. 5A and 5B. Since all of the segments are identical, only segments 55, 56 and 57 are illustrated in detail. Each of the segments 55, 56 and 57 has a triangular shape in cross section in a radial plane, as best shown in FIG. 5A. further, the segment 56 has circumferentially extending lips or pole teeth 59 which extend in a radial plane from one end of the segment, and the other two segments 55 and 57 have similar teeth 61 at their other ends. When nested together, the pole teeth 59 of the segments have their edges spaced slightly from the sides of the adjacent segments 55 and 57, thereby forming air gaps 63 between adjacent pole segments at both sides of the stator. FIG. 6 further illustrates the mounting of the pole segments 55, 56, and 57 within the openings of the turns of the one phase winding 30a which is wound in two adjacent planes as shown. FIG. 6 does not, however, show the pole teeth 59 which have been removed to better illustrate the slots 64 and the turns of the winding. The pole segments 55, 56, and 57 would, of course, be longer in the axial direction than illustrated in FIG. 6 to extend through the other phases.

Figure 7:
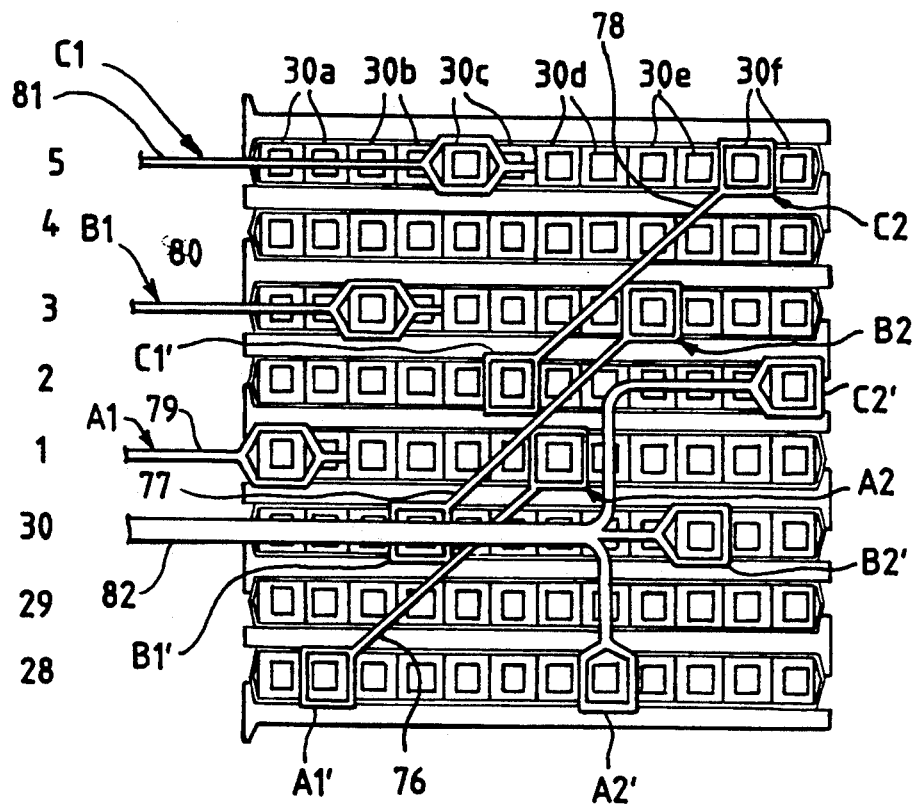
FIG. 7 is a diagram showing the electrical connections to two sets of three-phase windings.
Figure 8:
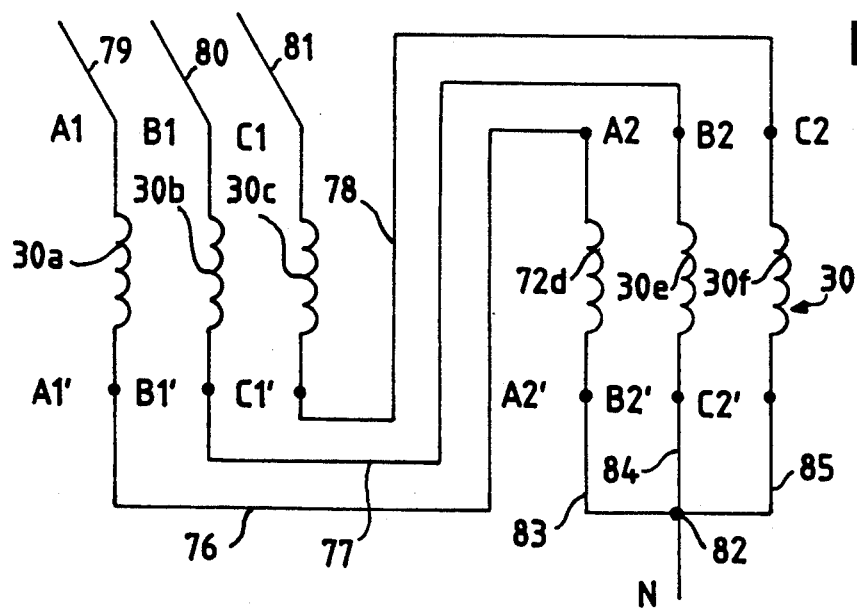
FIG. 8 is a schematic electrical diagram showing the connections of FIG. 7.

FIGS. 7 and 8 illustrate the mounting and connections of two sets of three-phase windings 30 in twelve axially adjacent planes, shown as vertical columns in FIG. 7. One set includes the windings 30a, 30b and 30c and the other set includes the windings 30d, 30e and 30f. The winding 30a is mounted in the first two adjacent planes (the two planes closest to the left as seen in FIGS. 1 and 7), the winding 30b is mounted in the third and fourth planes, the winding 30c is mounted in the fifth and sixth planes, the winding 30d is wound in the seventh and eighth planes, the winding 30e is wound in the ninth and tenth planes, and the winding 30f is wound in the eleventh and twelfth planes. The windings 30a and 30d are connected in series by a lead 76 (FIGS. 7 and 8), the windings 30b and 30e are connected in series by a lead 77, and the windings 30c and 30f are connected in series by a lead 78.

A lead 79 is connected to the winding 30a, a lead 80 is connected to the winding 30b, and a lead 81 is connected to the winding 30c. The other ends of windings 30d, 30e and 30f are connected to leads 83, 84 and 85 which are connected together by a neutral lead 82.

It will be apparent that the windings, particularly the windings 30b to 30e in the interior planes, will become heated during operation. To prevent the heat generated in the windings from becoming excessive, the windings 30 are made of hollow tubing to enable a coolant to flow therethrough. With reference to FIG. 2, a set of tubes 92 are connected by couplings 91 to the ends of the windings 30a, 30b and 30c, the tubes 92 being connected to a larger manifold tubing 93 which extends out of the casing through a coupling 94 (as shown in FIG. 1). Similarly, the ends of the windings 30d, 30e and 30f are connected by tubes 95 to a larger manifold tube 96 that leads out of the casing through a coupling similar to the coupling 94. Thus the windings 30 are provided with both electrical and coolant flow connections, and the coolant maintains the windings at a reasonable level even though the windings are stacked closely together and are surrounded by an encapsulating material. The electrical connections may be made by brazing leads to the outer surfaces of the tubular conductors.

To reduce hysteresis losses, the pole segments preferably comprise a stack of laminations. For example, the stator segments may be made by heat treating and bonding a stack of laminations together, and then shaping the segments by wire EDM. The segments are then acid etched to remove the recast layer produced by the machining operation, because the recast layer shorts the laminations.

The support structure (the encapsulating material) should be a non magnetic material such as a glass filled composite. For example, a glass reinforced polyimide (PMR-15) may be used.

Since the two sets of three-phase windings are connected in series, there are effectively four turns per coil. In some designs that do not require so many turns, one set of three-phase windings may be sufficient. In either event, the coolant flows through the phase windings in parallel.

What is claimed is:

1. Electromotive apparatus comprising:
   a) at least one stator winding formed by a plurality of coil turns, each of said coil turns having a triangular shape and being located in two axially adjacent planes, wherein the winding comprises an electrically conductive tube connected to electrical leads and wherein cooling fluid flows through the tube;
   b) a plurality of pole segments each having a generally triangular shape, said coil turns forming generally triangular open spaces and said pole segments being positioned in said open spaces;
   c) and encapsulating means around said coil turns and said pole segments for securing said coil turns and said pole segments together.

2. Electromotive apparatus as set forth in claim 1, and further including a casing having an interior space, said winding, said pole segments and said encapsulating means being positioned in said interior space, and said casing including holding means for engaging said encapsulating means and securing said winding and said pole segments against movement in said casing.

3. Electromotive apparatus as set forth in claim 1, and further including a casing for enclosing and supporting said winding, said pole segments and said encapsulating means.

4. Electromotive apparatus comprising:
   a) a support casing;
   b) a stator mounted in said support casing, said stator having a generally flat circular configuration and a central axis;
   c) first and second rotors rotatably mounted on said support casing for rotation on said axis, said rotors being on opposite sides of said stator and axially spaced from said stator to form first and second axial air gaps;
   d) said stator comprising a plurality of pole segments circumferentially spaced around said axis and extending axially to said first and second axial air gaps; and
   e) a winding comprising a plurality of coil turns which extend around said pole segments, said coil turns being located in two adjacent but axially spaced planes, wherein the winding comprises an electrically conductive tube connected to electrical leads and wherein cooling fluid flows through the tube.

5. Electromotive apparatus as set forth in claim 4, wherein said pole segments have first and second ends respectively adjacent said first and second axial air gaps, and each of said pole segments having pole teeth formed thereon at one of said first and second ends, said pole teeth of adjacent pole segments being alternately adjacent said first and second axial air gaps.

6. Electromotive apparatus as set forth in claim 4, and further comprising encapsulating means around said winding and said pole segments and secured to said support casing.

7. Electromotive apparatus as set forth in claim 4, and further including at least second and third windings, each of said second and third windings including a plurality of coil turns extending around said pole segments and being located in two adjacent but axially spaced planes.

8. Electromotive apparatus as set forth in claim 7, wherein said planes of said windings are axially adjacent each other.

9. Electromotive apparatus comprising:
   a) a plurality of separate pole segments, said segments being arranged in a circular pattern around an axis and being spaced apart to form a plurality of slots which extend radially outwardly from said axis; b) a first winding including a plurality of adjacent coil turns, each of said turns having a generally triangular shape and including two radially extending portions, an inner diameter end turn and an outer diameter end turn, said radially extending portions being located in said slots and said turns extending around said pole segments;
   c) a plurality of said coil turns, wherein a first of said coil turns extends through first selected slots, a second of said coil turns extends through said first selected slots, a third of said coil turns extends through second selected slots, and a fourth of said coil turns extends through said second selected slots, said first, second, third and fourth coil turns being progressively electrically connected in series, said first coil turn and said fourth coil turn being in a first plane, and said second coil turn and said third coil turn being in a second axially adjacent plane.

10. Electromotive apparatus as set forth in claim 9, wherein adjacent coil turns are in said first plane and said second oxially adjacent plane.

11. Electromotive apparatus as set forth in claim 9, wherein said first winding is formed by a hollow conductor adapted to carry a cooling fluid.

12. Electromotive apparatus as set forth in claim 9, and further including encapsulating means around said coil turns and said pole segments.

13. Electromotive apparatus comprising:
   a) a plurality of separate pole segments, said segments being arranged in a circular pattern around an axis and being spaced apart to form a plurality of slots which extend radially outwardly from said axis;
   b) a first winding including a plurality of adjacent coil turns, each of said turns having a generally triangular shape and including two radially extending portions, an inner diameter end turn and an outer diameter end turn, said radially extending portions being located in said slots and said turns extending around said pole segments;
   c) a plurality of said coil turns being in a first plane and another plurality of said turns being in a second axially adjacent plane; and
   d) second and third windings, said first, second and third windings being similarly constructed and being circumferentially offset, said second winding being in third and fourth adjacent planes and said third winding being in fifth and sixth adjacent planes.

* * * * *